United States Patent
Wang et al.

(10) Patent No.: US 8,671,445 B1
(45) Date of Patent: Mar. 11, 2014

(54) METHOD AND SYSTEM FOR TRANSFERRING REPLICATED INFORMATION FROM SOURCE STORAGE TO DESTINATION STORAGE

(75) Inventors: Xin Wang, Sewickley, PA (US); Keith A. Bare, II, Pittsburgh, PA (US)

(73) Assignee: NetApp, Inc., Sunnyvale, CA (US)

( * ) Notice: Subject to any disclaimer, the term of this patent is extended or adjusted under 35 U.S.C. 154(b) by 0 days.

(21) Appl. No.: 13/550,860

(22) Filed: Jul. 17, 2012

(51) Int. Cl.
*H04L 29/06* (2006.01)

(52) U.S. Cl.
USPC .............................. 726/10; 726/21

(58) Field of Classification Search
USPC .......................... 726/9, 10, 4, 6, 21
See application file for complete search history.

(56) References Cited

U.S. PATENT DOCUMENTS

2006/0098572 A1* 5/2006 Zhang et al. ................... 370/229
2007/0277232 A1* 11/2007 Cates et al. ....................... 726/6

* cited by examiner

*Primary Examiner* — Edward Zee
(74) *Attorney, Agent, or Firm* — Klein, O'Neill & Singh, LLP

(57) ABSTRACT

Machine implemented method and system for transferring replicated information from a first storage location managed by a storage operating system at a first storage system node and accessible to a client computing system to a second storage location managed by a second storage system node are provided. A resource pool having a plurality of tokens is maintained for authorizing a replication engine to transfer replicated information from the first storage location to the second storage location. The number of available tokens is increased when traffic due to client requests for accessing the first storage location is less than a first threshold level. The number of available tokens is decreased for reducing transfer of information via the replication engine, when latency in responding to the client requests reaches a second threshold value and the traffic due to client requests reaches the first threshold value.

22 Claims, 7 Drawing Sheets

METHOD AND SYSTEM FOR TRANSFERRING REPLICATED INFORMATION FROM SOURCE STORAGE TO DESTINATION STORAGE

TECHNICAL FIELD

The present disclosure relates to storage systems and more particularly to data replication of storage devices within the storage systems.

RELATED ART

A storage system typically comprises one or more storage devices where information may be stored and from where information may be retrieved, as desired. The storage system may be implemented in accordance with a variety of storage architectures including, but not limited to, a network-attached storage (NAS) environment, a storage area network (SAN) and a storage device assembly directly attached to a client or host computer.

The storage system typically includes a storage operating system that may implement a high-level module, such as a file system, to logically organize information stored at storage volumes as a hierarchical structure of data containers, such as files and logical units. For example, stored files may be implemented as set of data structures, i.e., storage device blocks, configured to store information, such as the actual data for the file. These data blocks are organized within a volume block number (vbn) space that is maintained by the file system. The file system typically organizes the data blocks within the vbn space as a "logical volume"; each logical volume may be, although is not necessarily, associated with its own file system.

The storage system may be configured to operate according to a client server model of information delivery to thereby allow many clients to access data containers stored on the system. In this model, the client may comprise an application, such as a database application, executing in a computer that communicates with the storage system. Each client may send input/output ("I/O") requests to read and write data containers.

A storage volume is commonly replicated at a source storage array and then transferred to a destination storage array. Transferring the replicated information can negatively affect processing of client I/O requests for reading and writing information at the storage arrays because during the transfer process the storage arrays have to be accessed and may not be fully available for processing client I/O requests. Continuous efforts are being made to optimally provide redundancy where replicated information may be stored at more than one location without undesirably impacting the processing of read and write requests.

SUMMARY

In one embodiment, a machine implemented method and system for transferring replicated information from a first storage location managed by a storage operating system at a first storage system node and accessible to a client computing system to a second storage location managed by a second storage system node are provided. A resource pool having a plurality of tokens is maintained for authorizing a replication engine to transfer replicated information from the first storage location to the second storage location. The number of available tokens is increased by a first increment value when traffic due to client requests for accessing the first storage location is less than a first threshold level.

The number of available tokens may also be increased by a second increment value when traffic due to client requests reaches the first threshold value but the latency in processing the client requests is less than a second threshold value. The number of available tokens is decreased for reducing transfer of information via the replication engine, when latency in responding to the client requests has reached the second threshold value and the traffic due to client requests has reached the first threshold value.

In another embodiment, a machine implemented method for transferring replicated information a first storage location managed by a storage operating system at a first storage system node and accessible to a client computing system to a second storage location managed by a second storage system node is provided. The method includes maintaining a resource pool having a plurality of tokens for authorizing a replication engine for transferring replicated information from the first storage location to the second storage location; and increasing a number of available tokens for enabling the replication engine to increase transfer of information when traffic due to client requests for accessing the first storage location is less than a first threshold level.

The method further includes decreasing the number of available tokens for reducing transfer of information via the replication engine, when latency in responding to the client requests has reached a second threshold value and the traffic due to client requests has reached the first threshold value.

In yet another embodiment, a machine implemented method for transferring replicated information from a first storage location managed by a storage operating system at a storage system node and accessible to a client computing system to a second storage location is provided. The method includes maintaining a resource pool having a plurality of tokens for authorizing a replication engine for transferring replicated information from the first storage location to the second storage location; and increasing a number of available tokens by a first increment value for enabling the replication engine to increase transfer of information when traffic due to client requests for accessing the first storage location is less than a first threshold level.

The method further includes increasing the number of available tokens by a second increment value for transfer of information via the replication engine, when latency in responding to the client requests is less than a second threshold value and the traffic due to client requests has reached the first threshold value; and decreasing the number of available tokens for reducing transfer of information via the replication engine, when latency in responding to the client requests has reached a second threshold value and the traffic due to client requests has reached the first threshold value.

This brief summary has been provided so that the nature of this disclosure may be understood quickly. A more complete understanding of the disclosure can be obtained by reference to the following detailed description of the various embodiments thereof in connection with the attached drawings.

BRIEF DESCRIPTION OF THE DRAWINGS

The foregoing features and other features will now be described with reference to the drawings of the various embodiments. In the drawings, the same components have the same reference numerals. The illustrated embodiments are intended to illustrate, but not to limit the present disclosure. The drawings include the owing Figures.

DETAILED DESCRIPTION

Figure 1A:
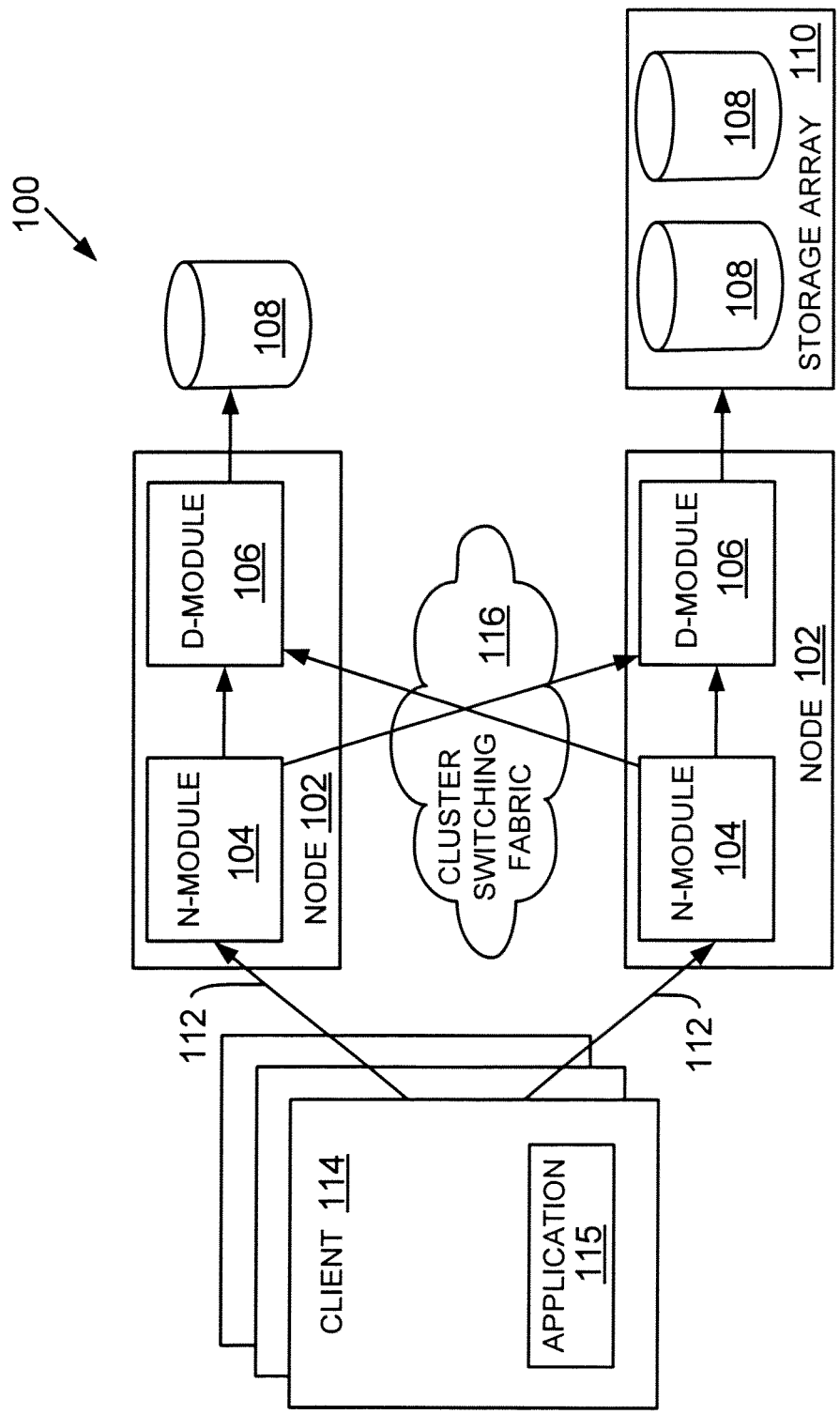
FIG. 1A shows a block diagram of a clustered system using the methodology of the present disclosure.

As preliminary note, the terms "component", "module", "system," and the like as used herein are intended to refer to a computer-related entity, either software-executing general purpose processor, hardware, firmware and a combination thereof. For example, a component may be, but is not limited to being, a process running on a processor, a processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, on non-transitory computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick or any other storage device, in accordance with the claimed subject matter.

In one embodiment, a machine implemented method and system for transferring replicated information from a first storage location managed by a storage operating system at a first storage system node and accessible to a client computing system to a second storage location managed by a second storage system node are provided. A resource pool having a plurality of tokens is maintained for authorizing a replication engine to transfer replicated information from the first storage location to the second storage location. The number of available tokens is increased by a first increment value when traffic due to client requests for accessing the first storage location is less than a first threshold level. The number of available tokens may also be increased by a second increment value when traffic due to client requests reaches the first threshold value but the latency in processing the client requests is less than a second threshold value. As an example, the second increment value may be less than the first increment value. The number of available tokens is decreased for reducing transfer of information via the replication engine, when latency in responding to the client requests reaches the second threshold value and the traffic due to client requests has reached the first threshold value.

To facilitate an understanding of the various embodiments of the present disclosure, the general architecture and operation of a networked, clustered storage system will now be described.

Clustered System:

FIG. 1A is a schematic block diagram of a plurality of storage system nodes 102 interconnected as a cluster 100 and configured to provide storage services related to organization of information at a plurality storage devices 108. Nodes 102 interface with various client computing systems 114 for reading and writing information stored at storage devices 108 managed by the nodes 102.

Nodes 102 comprise various functional components that cooperate to provide distributed storage system architecture of cluster 100. Each node 102 is generally organized as a network element (N-module 104) and a storage device element (D-module 106). N-module 104 includes functionality that enables node 102 to connect to client computing systems 114 over a network connection 112, while each D-module 106 connects to one or more storage devices, such as 108 or a storage array 110 having a plurality of storage devices 108. Illustratively, network 112 may be embodied as an Ethernet network, a Fibre Channel (FC) network or any other network type. Nodes 102 may be interconnected by a cluster switching fabric 116 which, in the illustrative embodiment, may be embodied as a Gigabit Ethernet switch or any other interconnect type.

It should be noted that while there is shown an equal number of N and D-modules in the illustrative cluster 100, there may be differing numbers of N and/or D-modules in accordance with various embodiments of the present disclosure. For example, there may be a plurality of N-modules and/or D-modules interconnected in a cluster configuration 100 that does not reflect a one-to-one correspondence between the N and D-modules. As such, the description of a node 102 comprising one N-module and one D-module should be taken as illustrative only.

Clients 114 may be general purpose computers having a plurality of components, as described below in detail with respect to FIG. 4. These components may include a central processing unit (CPU), main memory, I/O devices, and storage devices (for example, flash memory, hard drives and others). The main memory may be coupled to the CPU via a system bus or a local memory bus. The main memory may be used to provide the CPU access to data and/or program information that is stored in main memory at execution time. Typically, the main memory is composed of random access memory (RAM) circuits. A computer system with the CPU and main memory is often referred to as a host system.

Clients 114 may be configured to interact with a node 102 in accordance with a client/server model of information delivery. That is, each client 114 may request the services of the node 102, and node 102 may return the results of the services requested by the client 114 over network 112. Clients 114 may be configured to execute processor executable instructions, shown as application 115 for reading and writing information at storage devices 108. Such application 115 may include a database application, a financial management system, an electronic mail application or any other application type.

Client 114 may issue packets using application 115 including file-based access protocols, such as the Common Internet File System ("CIFS") protocol or the Network File System ("NFS") protocol, over the Transmission Control Protocol/Internet Protocol ("TCP/IP") when accessing information in the form of certain data containers. Alternatively, the client 114 may issue packets using application 115 including block-based access protocols, such as the Small Computer Systems Interface ("SCSI") protocol encapsulated over TCP ("iSCSI") and SCSI encapsulated over Fibre Channel ("FCP"), when accessing information in the form of other data containers, such as blocks.

Figure 2:
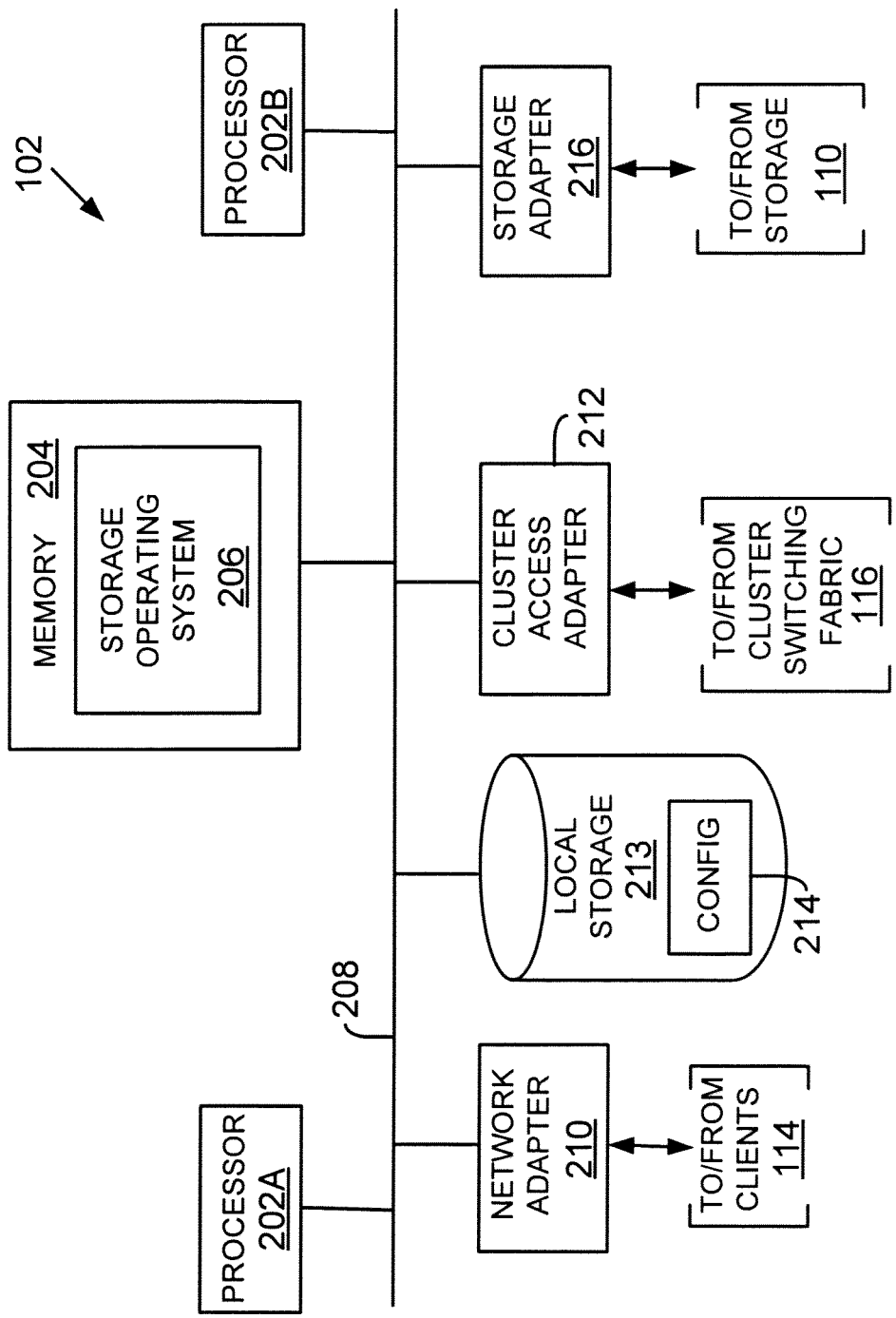
FIG. 2 shows an example of a node used by the system of FIG. 1A.
Figure 3:
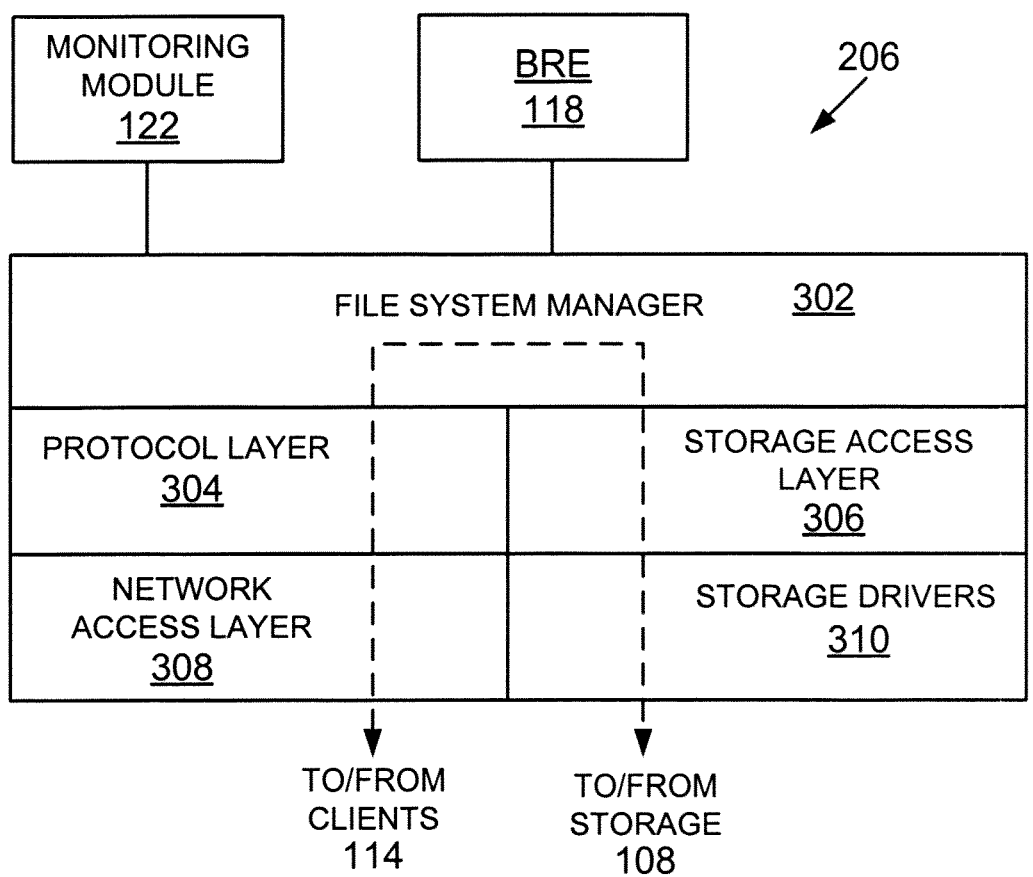
FIG. 3 shows an example of an operating system used according to one embodiment of the present disclosure.

In one example, one or both of N-Module 104 and D-Module 106 execute a plurality of layers of a storage operating system (206, FIGS. 2 and 3). These layers include a file system manager that keeps track of a directory structure (hierarchy) of the data stored in storage devices 108 and manages read/write operations, i.e. executes read/write operations on storage devices in response to client 114 requests.

In cluster 100, for storing and retrieving information, it is sometimes advantageous to duplicate all or part of a file system. For example, one purpose for duplicating a file system is to maintain a backup copy of the file system to protect against lost information. Another purpose for duplicating a file system is to provide replicas of the data in the file system at multiple servers to share load incurred in accessing that data.

One common way of replicating a file system is by taking "snapshots" (without derogation of any trademark rights of NetApp Inc.), which means a point in time copy of a storage file system. A snapshot is a persistent point in time (PPT) image of an active file system that enables quick recovery of data after data has been corrupted, lost, or altered. Snapshots can be created by copying data from a storage volume at each predetermined point in time to form a consistent image, or virtually by using a pointer to form the image of the data. Often, snapshot data is copied (or mirrored) from a source storage array to a destination storage array. Snapmirror technology from NetApp Inc. may be used to mirror snapshots from the source array to the destination array, as described below with respect to FIG. 1B.

Figure 1B:
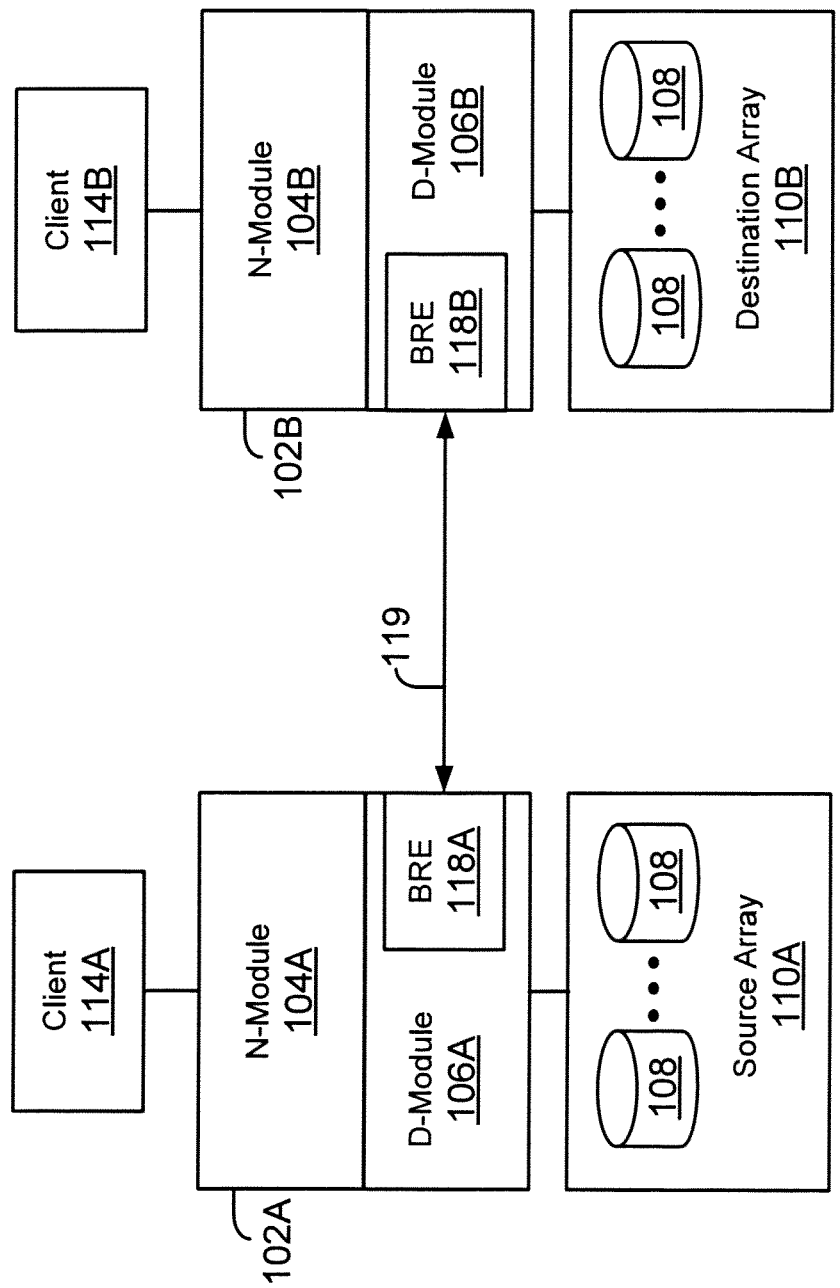
FIG. 1B shows an example of transferring a snapshot from a source array to a destination array.

FIG. 1B shows a source storage array 110A that may be used to store a snapshot of a storage volume. The source storage array 110A is managed by node 102A that provides access to storage array 110A to one or more client 114A. Node 102B manages a destination source storage array 110B that may be used to store a mirrored copy of the snapshot from source array 110A.

In one embodiment, a block replication engine (BRE) 118 (shown as 118A for node 102A and 118B for node 102B) may be used to transfer a snapshot from source array 110A to destination array 110B via a network link 119, which may be similar to the cluster switching fabric 116 or the network link 112 described above. BRE 118 may use a generic file and/or block-based "agnostic" protocol having a collection of methods/functions constituting an application programming interface (API) for transferring information from the source array 110A to the destination array 110B. Example of such an agnostic protocol is the SpinNP protocol available from NetApp, Inc. The embodiments disclosed herein are not limited to any particular protocol/standard for transferring the information from the source array 110A to the destination array 110B.

One challenge for transferring information from the source array 110A to the destination array 110B using BRE 118 is that it may negatively impact processing of client 114 requests for reading or writing information because BRE 118 gets access to storage devices 108 for transferring information. The negative impact may be due to lower data transfer to clients or delay (i.e. latency) in executing read and write operations. The embodiments disclosed herein provide an optimum system/methodology for handling client related operations as well as performing transfer operations for transferring information from source array 110A to destination array 110B.

FIG. 10 shows an example of a system executed by D-Module 106 for efficiently managing transfer from the source storage array 110A to the destination storage array 110B, according to one embodiment. D-Module 106 maintains a BRE resource pool 120 having a plurality of tokens 120A-120N (shown as R1-RN), where N could be any number. In one embodiment, a token is a data structure that includes a message data structure which BRE 118 obtains to make a request to a storage array for reading or writing information. The message data structure may be used to read information at source storage array 110A or write to the destination storage array 110B. The total number of available tokens, i.e. 120A-120N at any given time may be limited by a maximum threshold value. The maximum threshold value is an upper limit beyond which the system cannot allocate any more tokens to BRE 118. The tokens are an indicator or permission for BRE 118 to present to the storage operating system 206 (FIG. 2) to access storage devices at the source array 110A and/or destination array 110B for transferring information from the source array 110A to the destination array 110B. If BRE 118 has more of tokens 120A-120N, then it means that it can transfer more information compared to when it has fewer tokens. In one embodiment, the processes and systems disclosed herein optimize allocation of tokens 120A-120N.

O-Module 106 executes a processor executable monitoring module 122 using a data structure 124 having a plurality of fields 124A-124H. The plurality of fields may be used to increase allocation of tokens 120A-120N to BRE 118 or decrease allocation of tokens 120A-120N. The various fields are now described below in detail:

Field 124A is based on an amount of traffic that is being handled/processed by node 102 at any given time interval (I) that is specified by field 124G. Traffic in this context means requests from clients 114 and/or other nodes within the cluster 100. The storage operating system 206 maintains this data since it processes all read and write requests for one or more clients 114. The monitoring module 122 obtains traffic information by periodically requesting that information from storage operating system 206.

Field 124B is a measure of latency in processing client requested operations. Field 124B may be the queuing time a message from one of the layers of storage operating system 206 has to wait to read or write information. This duration is indicative of the overall latency at a node to process client requests. In one embodiment, monitoring module 122 obtains this information from storage operating system 206 that may store this information to track overall system efficiency in processing client requests.

Field 124C is a first threshold value (T1) that may be programmed and is associated with field 124A. If a number of client operations is less than T1, then it indicates that client traffic is low and hence the tokens allocated to BRE 118 from the BRE resource pool may be incremented by a certain value M1 that is indicated by field 124D.

Field 124E is a second threshold value (T2) that is associated with overall latency as indicated by field 124B. T2 may be used as indicator of low latency, which may be used to increase the number of allocated tokens by an amount M2 as provided by field 124F. In one embodiment, M2 may be less than M1 because it assumes that client operations are in progress at any given time and by increasing M2 by a bigger value example, greater than M1), it may cause more latency or delay in processing active client requests. The values for M1 and M2 may be set based on the usage of storage system nodes 102 by clients 114 to store information, for example, based on the amount of data that clients store, frequency of accessing storage system nodes, frequency of replicating information from the source storage array to the destination storage array and others. Thus M1 and M2 may be fixed or configured by a storage administrator (not shown) managing the system of FIG. 1A. The use of M2 and M1 values is described in more detail below.

Field 124H is a scaling factor that is used to decrease the number of tokens allocated to BRE 118, when latency is greater than T2. The scaling factor may be based on a current average latency within the interval I. As an example, assume that a latency value for processing client requests is 100 millisecond, then using a scaling factor of 50%; the number of available tokens may be decreased by 50. In this example, the scaling factor is multiplied by the latency to determine the amount by which the number of tokens is decreased.

The scaling factor may be a fixed or configurable value. The scaling factor value may be set based on the usage of storage system nodes 102 by clients 114 to store information, for example, based on the amount of data that clients store, frequency of accessing storage system nodes, frequency of replicating information from the source storage array to the destination storage array and others. This information is typically maintained by storage operating system 206.

The various fields' 124A-124H parameters) are selected such that a decrease in available tokens due to high latencies is greater than an increase in available tokens when client traffic or latency is low. This allows a D-Module 106 to respond quickly to reduce latency if it suddenly becomes high. When the latency drops, the increase in the number of tokens is gradual until the threshold value T2 is reached. This avoids unpredictable swings in overall performance of handling client requests.

In one embodiment, two separate token pools (120A-120N) may be maintained at BRE resource pool 120. A first token pool is maintained to read information from the source storage array 110A and a second token pool may be used for writing to the destination array 110B. The scaling mechanism described below with respect to FIG. 1D may be the same for both read and write operations, but the various parameters, for example, T1, T2, M1, M2 and S may be different for the read and write operations.

Figure 1C:
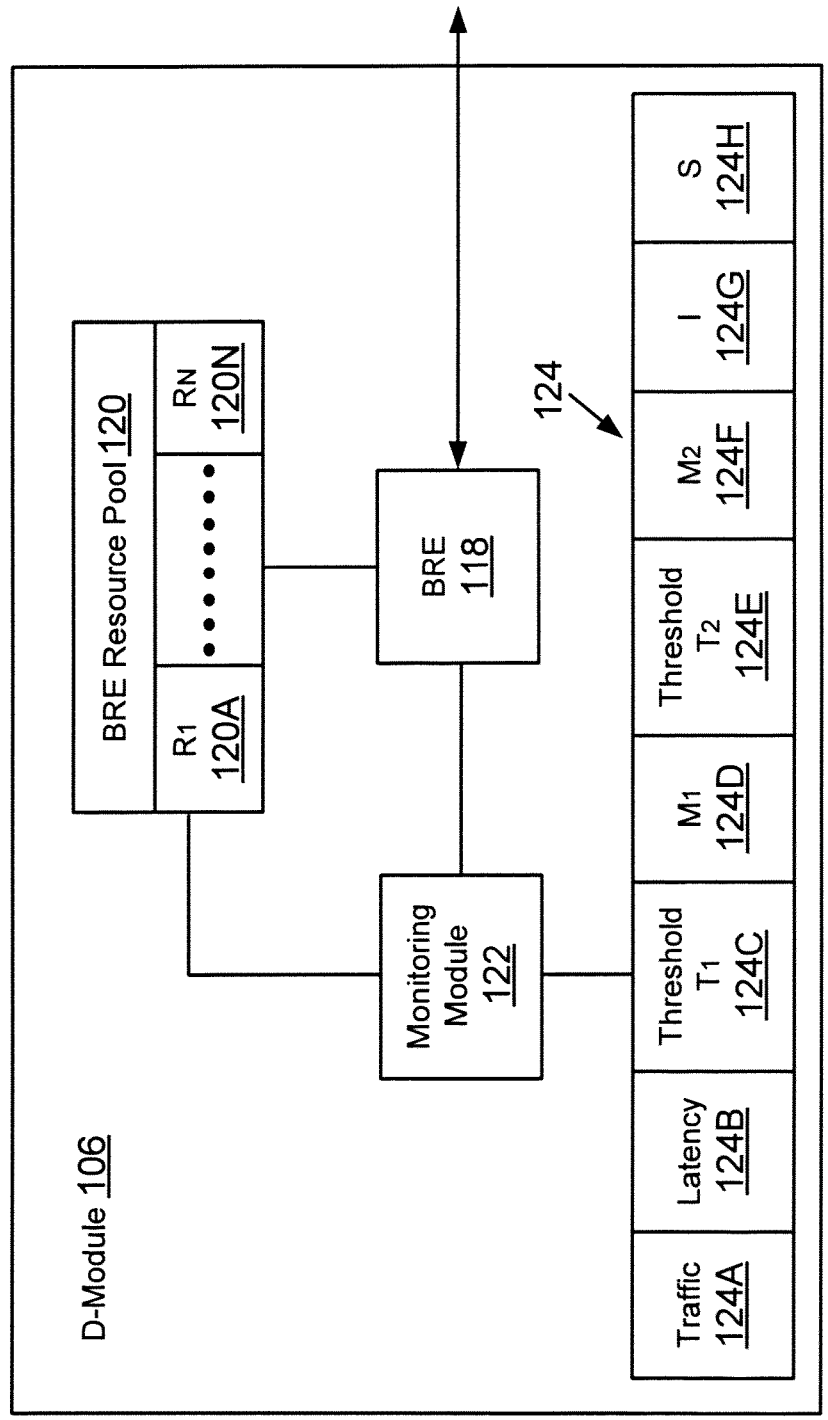
FIG. 1C shows an example of a system for managing transfer of information from the source array to the destination array.

It is noteworthy that although the source and destination arrays in FIG. 1B are shown as being managed by separate nodes 102A-1028, the embodiments disclosed herein are equally applicable to an architecture where both the source and destination arrays are managed by the same node i.e. the source array 110A and the destination array 110B may be managed by a single node 102A and the data structures of FIG. 1C and the process flow described below in detail are applicable to that architecture.

Figure 1D:
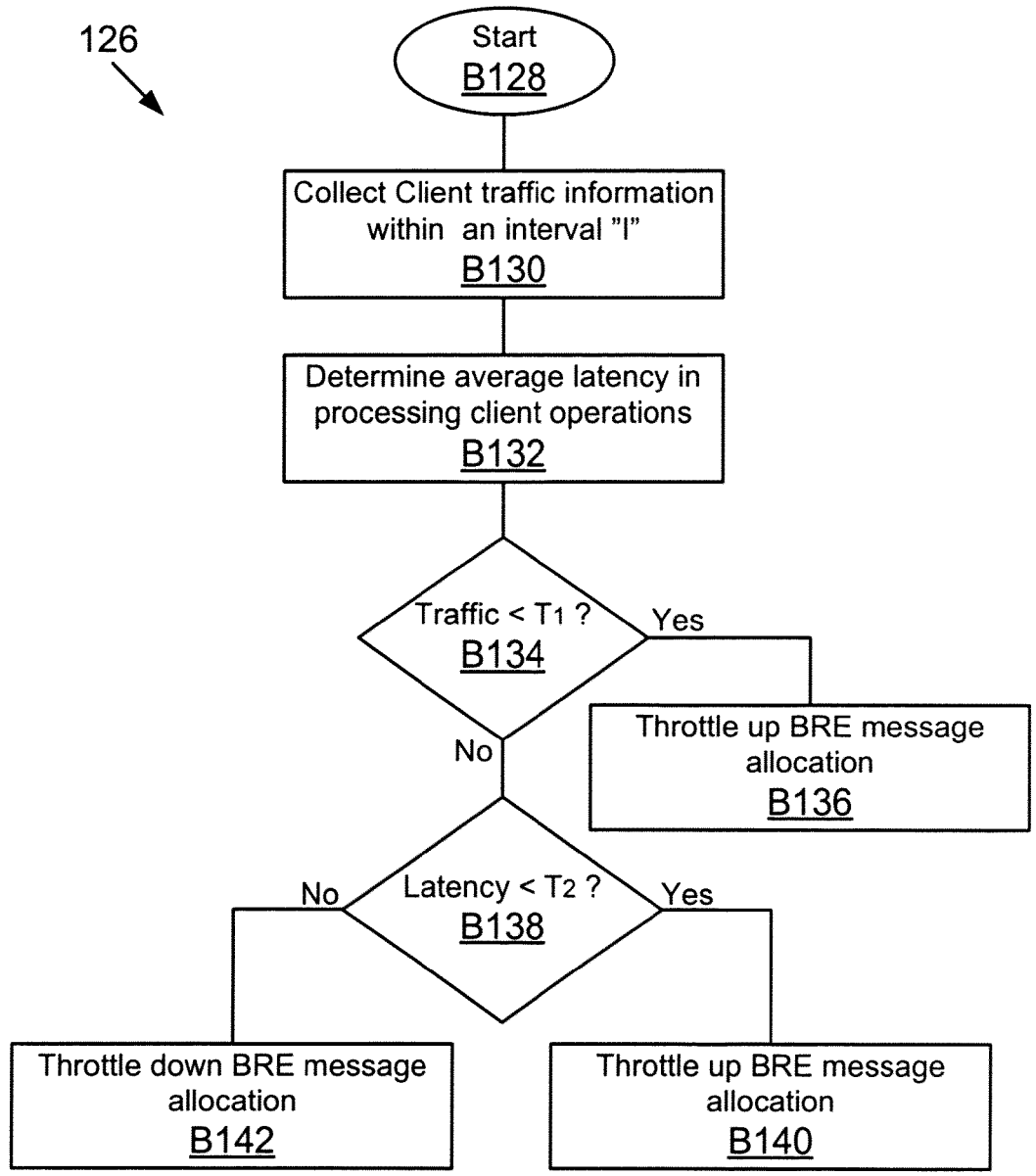
FIG. 1D shows a process flow diagram, according to one embodiment.

FIG. 1D shows a process 126 for optimizing use of BRE 118, according to one embodiment. The process begins in block B128. In block B130, monitoring module 122 collects client traffic information within interval I. The traffic information is used to populate field 124A. The average latency in processing read and write requests is determined in block B132 to populate field 124B. In one embodiment, storage operating system 206 maintains the information for determining latency since it has to process read and write requests.

In block B134, the client traffic is compared to the first threshold T1. If the traffic is less than T1, then in block B136, the number of allocated tokens for BRE 118 is increased by an amount M1.

If the traffic is greater than or equal to T1 (or has reached T1), then in block B138, monitoring module 122 determines if the latency is less than the second threshold T2. If the latency is less than T2, then in block B140, the number of tokens is increased by an amount M2. As described above, in one embodiment, M2 is less than M1. If the latency is greater than or equal to T2 (i.e. has reached T2), then in block B142, the number of tokens is decreased by using the scaling factor S that may be fixed value or a dynamic value based on the overall storage environment, as explained above.

The system and processes described herein have advantages because transfer from the source array 110A to the destination array 110B minimally affect client operations or delay client operations negatively. The frequent monitoring is self-adjusting and hence automatic.

Storage System Node:

FIG. 2 is a block diagram of a node 102 that is illustratively embodied as a storage system comprising of a plurality of processors 202A-202B, a memory 204, a network adapter 210, a cluster access adapter 212, a storage adapter 216 and local storage 213 interconnected by an interconnect system (referred to as bus) 208. The local storage 213 comprises one or more storage devices, such as disks, non-volatile storage devices, flash drives, video tape, optical, DVD, magnetic tape, bubble memory, electronic random access memory, micro-electro mechanical and any other similar media adapted to store information. The local storage 213 may be utilized by the node to locally store configuration information (e.g., in a configuration data structure 214).

Processors 202A/202B may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware based devices. The bus system 208 may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type.

The cluster access adapter 212 comprises a plurality of ports adapted to couple node 102 to other nodes of cluster 100. In the illustrative embodiment, Ethernet may be used as the clustering protocol and interconnect media, although it will be apparent to those skilled in the art that other types of protocols and interconnects may be utilized within the cluster architecture described herein. In alternate embodiments where the N-modules and D-modules are implemented on separate storage systems or computers, the cluster access adapter 212 is utilized by the N/D-module for communicating with other N/D-modules in the cluster 100.

The network adapter 210 comprises a plurality of ports adapted to couple the node 102 to one or more clients 114 over point-to-point links, wide area networks, virtual private networks implemented over a public network (Internet) or a shared local area network. The network adapter 210 thus may comprise the mechanical, electrical and signaling circuitry needed to connect the node to the network.

The storage adapter 216 cooperates with a storage operating system 206 executing on the node 102 to access information requested by the clients. The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored on the storage devices 108 of array 110 (FIG. 1A). The storage adapter 216 comprises a plurality of ports having input/output (I/O) interface circuitry that couples to the storage devices over an I/O interconnect arrangement, such as a conventional high-performance, FC link topology.

It is noteworthy that although various adapters (210, 212 and 216) have been shown as separate hardware based components, the embodiments disclosed herein are not limited to separate components. The embodiments disclosed herein may be implemented using a converged network adapter (CAN) that is capable of handling both network and storage protocols, for example, a Fibre Channel over Ethernet (FCoE) adapter.

Each node 102 is illustratively embodied as a multiple processor system executing the storage operating system 206 that preferably implements a high-level module, such as a file system, to logically organize the information as a hierarchical structure of named directories, files and special types of files called virtual disks (hereinafter generally "blocks") on storage devices 108. However, it will be apparent to those of ordinary skill in the art that the node 102 may alternatively comprise a single or more than two processor systems. Illustratively, one processor 202A executes the functions of the N-module 104 on the node, while the other processor 202B executes the functions of the D-module 106.

The memory 204 illustratively comprises storage locations that are addressable by the processors and adapters for storing programmable instructions and data structures. The processor and adapters may, in turn, comprise processing elements and/or logic circuitry configured to execute the programmable instructions and manipulate the data structures. It will be apparent those skilled in the art that other processing and memory means, including various computer readable media, may be used for storing and executing program instructions pertaining to the disclosure described herein.

The storage operating system 206, portions of which is typically resident in memory and executed by the processing elements, functionally organizes the node 102 by, inter alia, invoking storage operations in support of the storage service implemented by the node and maintaining client traffic and latency information described above. An example of operating system 206 is the DATA ONTAP® (Registered trademark of NetApp, Inc.) operating system available from NetApp, Inc. that implements a Write Anywhere File Layout (WAFL® (Registered trademark of NetApp, Inc.)) file system. However, it is expressly contemplated that any appropriate storage operating system may be enhanced for use in accordance with the inventive principles described herein. As such, where the term "ONTAP" is employed, it should be taken broadly to refer to any storage operating system that is otherwise adaptable to the teachings disclosed herein.

Storage of information on each storage array 110 is preferably implemented as one or more storage volumes that comprise a collection of physical storage devices 108 cooperating to define an overall logical arrangement of volume block number (vbn) space on the volume(s). Each logical volume is generally, although not necessarily, associated with its own file system. The storage devices 108 within a logical volume/file system are typically organized as one or more groups, wherein each group may be operated as a Redundant Array of Independent (or Inexpensive) Disks (RAID). Details regarding storage operating system 206 are provided below with respect to FIG. 3.

Operating System:

FIG. 3 illustrates a generic example of operating system 206 executed by node 102, according to one embodiment of the present disclosure. Storage operating system 206 interfaces with monitoring module 122 and BRE 118, stores client traffic information and latency information. The traffic and latency information is provided to monitoring module 122 for executing the process steps of FIG. 1D, as described above. The BRE resource pool tokens are provided to BRE 118 for transferring information, as described above in detail.

In one example, operating system 206 may include several modules, or "layers" executed by one or both of N-Module 104 and D-Module 106. These layers include a file system manager 302 that keeps track of a directory structure (hierarchy) of the data stored in storage devices and manages read/write operations, i.e. executes read/write operations on storage devices in response to client 114 requests. File system manager 302 may also maintain information regarding client traffic and latency that are then used in the process flow of FIG. 1D, described above.

Operating system 206 may also include a protocol layer 304 and an associated network access layer 308, to allow node 102 to communicate over a network with other systems, such as clients 114. Protocol layer 304 may implement one or more of various higher-level network protocols, such as NFS, CIFS, Hypertext Transfer Protocol (HTTP), TCP/IP and others.

Network access layer 308 may include one or more drivers, which implement one or more lower-level protocols to communicate over the network, such as Ethernet. Interactions between clients 114 and mass storage devices 108 are illustrated schematically as a path, which illustrates the flow of data through operating system 206.

The operating system 206 may also include a storage access layer 306 and an associated storage driver layer 310 to allow D-module 106 to communicate with a storage device. The storage access layer 306 may implement a higher-level disk storage protocol, such as RAID, while the storage driver layer 310 may implement a lower-level storage device access protocol, such as FC or SCSI. In one embodiment, the storage access layer 306 may implement the RAID protocol, such as RAID-4 or RAID-DP™ (RAID double parity for data protection provided by NetApp Inc. the assignee of the present disclosure).

The file system 302 is illustratively a message-based system that provides logical volume management capabilities for use in access to the information stored on the storage devices, such as disks. The file system 302 illustratively may implement the write-anywhere file system having an on-disk format representation that is block-based using, e.g., 4 kilobyte (KB) blocks and using index nodes ("inodes") to identify data containers and data container attributes (such as creation time, access permissions, size and block location). The file system uses data containers to store meta-data describing the layout of its file system; these meta-data data containers include, among others, an inode data container. A data container handle, i.e., an identifier that includes an inode number (inum), may be used to retrieve an inode from storage device.

Broadly stated, all modes of the write-anywhere file system are organized into the inode data container. A file system (fs) info block specifies the layout of information in the file system and includes an inode of a data container that includes all other modes of the file system. Each logical volume (file system) has an fsinfo block that is preferably stored at a fixed location within, e.g., a RAID group. The inode of the inode data container may directly reference (point to) data blocks of the inode data container or may reference indirect blocks of the inode data container that, in turn, reference data blocks of the inode data container. Within each data block of the inode data container are embedded modes, each of which may reference indirect blocks that, in turn, reference data blocks of a data container.

Operationally, a request from the client 114 is forwarded as a packet over the computer network 112 and onto the node 102 where it is received at the network adapter 210. A network driver processes the packet and, if appropriate, passes it on to a network protocol and file access layer for additional processing prior to forwarding to the write-anywhere file system 302. Here, the file system generates operations to load (retrieve) the requested data from storage device 108 if it is not resident "in core", i.e., in memory 204.

If the information is not in memory, the file system 302 indexes into the inode data container using the inode number (inum) to access an appropriate entry and retrieve a logical vbn. The file system then passes a message structure including the logical vbn to the RAID system; the logical vbn is mapped to a storage device identifier and storage device block number (storage device, dbn) and sent to an appropriate driver (e.g., a SCSI driver (not shown)). The storage device driver accesses the dbn from the specified storage device 108 and loads the requested data block(s) in memory for processing by the node. Upon completion of the request, the node (and operating system) returns a reply to the client 114.

As described above, processing client requests need access to storage devices 108. Access to storage devices 108 may not be fully available when a replicated storage volume is transferred from a source array to a destination array. The embodiments described herein optimize the transfer process without negatively impacting processing of client requests.

It should be noted that the software "path" through the operating system layers described above needed to perform data storage access for a client request received at node 102 may alternatively be implemented in hardware. That is, in an alternate embodiment of the disclosure, the storage access request data path may be implemented as logic circuitry embodied within a field programmable gate array (FPGA) or an ASIC. This type of hardware implementation increases the performance of the file service provided by node 102 in response to a file system request issued by client 114.

As used herein, the term "storage operating system" generally refers to the computer-executable code operable on a computer to perform a storage function that manages data access and may, in the case of a node 102, implement data access semantics of a general purpose operating system. The storage operating system can also be implemented as a microkernel, an application program operating over a general-purpose operating system, such as UNIX® or Windows XP®, or as a general-purpose operating system with configurable functionality, which is configured for storage applications as described herein.

In addition, it will be understood to those skilled in the art that the disclosure herein may apply to any type of special-purpose (e.g., file server, filer or storage serving appliance) or general-purpose computer, including a standalone computer or portion thereof, embodied as or including a storage system. Moreover, the teachings of this disclosure can be adapted to a variety of storage system architectures including, but not limited to, a network-attached storage environment, a storage area network and a disk assembly directly-attached to a client or host computer. The term "storage system" should therefore be taken broadly to include such arrangements in addition to any subsystems configured to perform a storage function and associated with other equipment or systems. It should be noted that while this description is written in terms of a write anywhere file system, the teachings of the present disclosure may be utilized with any suitable file system, including a write in place file system.

Figure 4:
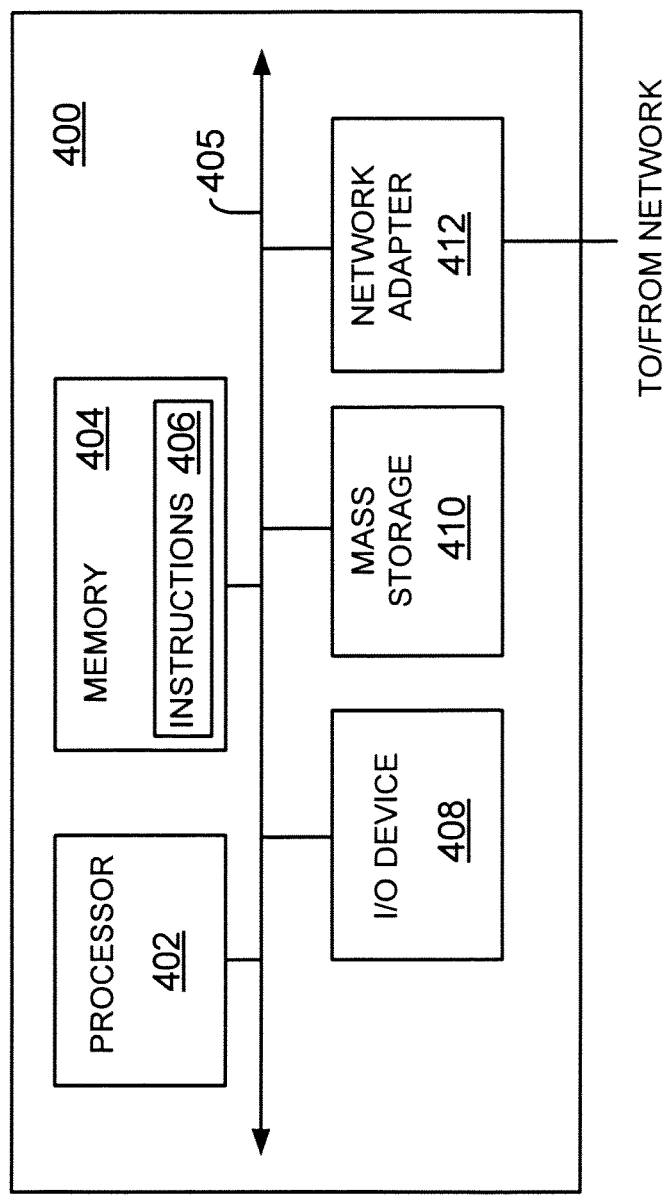
FIG. 4 shows a block diagram of a system, using the methodology of the present disclosure.

Processing System:

FIG. 4 is a high-level block diagram showing an example of the architecture of a processing system, at a high level, in which executable instructions as described above can be implemented. The processing system 400 can represent clients 114 and other components. Note that certain standard and well-known components which are not germane to the present disclosure are not shown in FIG. 4.

The processing system 400 includes one or more processors 402 and memory 404, coupled to a bus system 405. The bus system 405 shown in FIG. 4 is an abstraction that represents any one or more separate physical buses and/or point-to-point connections, connected by appropriate bridges, adapters and/or controllers. The bus system 405, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processors 402 are the central processing units (CPUs) of the processing system 400 and, thus, control its overall operation. In certain embodiments, the processors 402 accomplish this by executing programmable instructions stored in memory 404. A processor 402 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 404 represents any form of random access memory (RAM), read-only memory (ROM), flash memory, or the like, or a combination of such devices. Memory 404 includes the main memory of the processing system 400. Instructions 406 which implements techniques introduced above may reside in and may be executed (by processors 402) from memory 404.

Also connected to the processors 402 through the bus system 405 are one or more internal mass storage devices 410, and a network adapter 412. Internal mass storage devices 410 may be or may include any conventional medium for storing large volumes of data in a non-volatile manner, such as one or more magnetic or optical based disks. The network adapter 412 provides the processing system 400 with the ability to communicate with remote devices (e.g., storage servers) over a network and may be, for example, an Ethernet adapter, a FC adapter, or the like. The processing system 400 also includes one or more input/output (I/O) devices 408 coupled to the bus system 405. The I/O devices 408 may include, for example, a display device, a keyboard, a mouse, etc.

Cloud Computing:

The system and techniques described above are applicable and useful in the upcoming cloud computing environment. Cloud computing means computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. The term "cloud" is intended to refer to the Internet and cloud computing allows shared resources, for example, software and information to be available, on-demand, like a public utility.

Typical cloud computing providers deliver common business applications online which are accessed from another web service or software like a web browser, while the software and data are stored remotely on servers. The cloud computing architecture uses a layered approach for providing application services. A first layer is an application layer that is executed at client computers. In this example, the application allows a client to access storage via a cloud.

After the application layer, is a cloud platform and cloud infrastructure, followed by a "server" layer that includes hardware and computer software designed for cloud specific services. Details regarding these layers are not germane to the inventive embodiments.

Thus, a method and apparatus for optimizing information transfer from a source array to a destination array have been described. Note that references throughout this specification to "one embodiment" or "an embodiment" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics being referred to may be combined as suitable in one or more embodiments of the disclosure, as will be recognized by those of ordinary skill in the art.

While the present disclosure is described above with respect to what is currently considered its preferred embodiments, it is to be understood that the disclosure is not limited to that described above. To the contrary, the disclosure is intended to cover various modifications and equivalent arrangements within the spirit and scope of the appended claims.

What is claimed is:

1. A machine implemented method for transferring replicated information from a first storage location managed by a storage operating system at a first storage system node and accessible to a client computing system to a second storage location managed by a second storage system node, comprising:

maintaining a resource pool having a plurality of tokens for authorizing a replication engine for transferring replicated information from the first storage location to the second storage location;

increasing a number of available tokens for enabling the replication engine to increase transfer of information when traffic due to client requests for accessing the first storage location is less than a first threshold level; and decreasing the number of available tokens for reducing transfer of information via the replication engine, when latency in responding to the client requests has reached a second threshold value and the traffic due to client requests has reached the first threshold value;

wherein a processor executable monitoring module in the first storage system for maintaining a data structure used for increasing and decreasing the number of available tokens;

wherein the data structure stores a first increment value for increasing the number of tokens when traffic due to client requests for accessing the first storage location is less than the first threshold level; and wherein the data structure stores a second increment value less than the first increment value for increasing the number of tokens when latency in responding to the client requests is less than the second threshold value and the traffic due to client requests has reached the first threshold value.

2. The method of claim 1, wherein the data structure stores the first threshold value and the second threshold value.

3. The method of claim 1, wherein the data structure stores traffic information obtained from the storage operating system.

4. The method of claim 1, wherein the data structure stores latency information obtained from the storage operating system.

5. A machine readable, non-transitory, storage medium storing executable instructions, which when executed by a machine, causes the machine to perform a process for transferring replicated information from a first storage location managed by a storage operating system at a first storage system node and accessible to a client computing system to a second storage location managed by a second storage system node, comprising:

maintaining a resource pool having a plurality of tokens for authorizing a replication engine for transferring replicated information from the first storage location to the second storage location;

increasing a number of available tokens for enabling the replication engine to increase transfer of information when traffic due to client requests for accessing the first storage location is less than a first threshold level; and decreasing the number of available tokens for reducing transfer of information via the replication engine, when latency in responding to the client requests has reached a second threshold value and the traffic due to client requests has reached the first threshold value;

wherein a processor executable monitoring module in the first storage system for maintaining a data structure used for increasing and decreasing the number of available tokens;

wherein the data structure stores a first increment value for increasing the number of tokens when traffic due to client requests for accessing the first storage location is less than the first threshold level; and;

wherein the data structure stores a second increment value less than the first increment value for increasing the number of tokens when latency in responding to the client requests is less than the second threshold value and the traffic due to client requests has reached the first threshold value.

6. The storage medium of claim 5, wherein the data structure stores the first threshold value and the second threshold value.

7. The storage medium of claim 5, wherein the data structure stores traffic information obtained from the storage operating system.

8. The storage medium of claim 5, wherein the data structure stores latency information obtained from the storage operating system.

9. A computer program product, comprising: a computer usable, non-transitory, storage medium having computer readable instructions embodied therein for transferring replicated information from a first storage location managed by a storage operating system at a first storage system node and accessible to a client computing system to a second storage location managed by a second storage system node, comprising:

instructions for maintaining a resource pool having a plurality of tokens for authorizing a replication engine for transferring replicated information from the first storage location to the second storage location;

instructions for increasing a number of available tokens for enabling the replication engine to increase transfer of information when traffic due to client requests for accessing the first storage location is less than a first threshold level; and instructions for decreasing the number of available tokens for reducing transfer of information via the replication engine, when latency in responding to the client requests exceeds a second threshold value and the traffic due to client requests is greater than the first threshold value;

wherein a processor executable monitoring module in the first storage system for maintaining a data structure used for increasing and decreasing the number of available tokens;

wherein the data structure stores a first increment value for increasing the number of tokens when traffic due to client requests for accessing the first storage location is less than the first threshold level; and;

wherein the data structure stores a second increment value less than the first increment value for increasing the number of tokens when latency in responding to the client requests is less than the second threshold value and the traffic due to client requests has reached the first threshold value.

10. The computer program product of claim 9, wherein the data structure stores the first threshold value and the second threshold value.

11. The computer program product of claim 9, wherein the data structure stores traffic information obtained from the first storage system.

12. The computer program product of claim 9, wherein the data structure stores latency information obtained from the storage operating system.

13. A machine implemented method for transferring replicated information from a first storage location managed by a storage operating system at a storage system node and accessible to a client computing system to a second storage location, comprising:

maintaining a resource pool having a plurality of tokens for authorizing a replication engine for transferring replicated information from the first storage location to the second storage location;

increasing a number of available tokens by a first increment value for enabling the replication engine to increase transfer of information when traffic due to client requests for accessing the first storage location is less than a first threshold level;

increasing the number of available tokens by a second increment value for transfer of information via the replication engine, when latency in responding to the client requests is less than a second threshold value and the traffic due to client requests has reached the first threshold value; wherein the second increment value is less than the first increment value; and decreasing the number of available tokens for reducing transfer of information via the replication engine, when latency in responding to the client requests has reached a second threshold value and the traffic due to client requests has reached the first threshold value.

14. The method of claim 13, wherein a processor executable monitoring module interfaces with the storage system for maintaining a data structure used for increasing and decreasing the number of available tokens.

15. The method of claim 14, wherein the data structure stores the first threshold value and the second threshold value.

16. The method of claim 14, wherein the data structure stores traffic information obtained from the storage operating system.

17. The method of claim 14, wherein the data structure stores latency information obtained from the storage operating system.

18. A machine implemented method for transferring replicated information from a first storage location managed by a storage operating system at a storage system node and accessible to a client computing system to a second storage location, comprising:

maintaining a resource pool having a plurality of tokens for authorizing a replication engine for transferring replicated information from the first storage location to the second storage location;

increasing a number of available tokens by a first increment value for enabling the replication engine to increase transfer of information when traffic due to client requests for accessing the first storage location is less than a first threshold level;

increasing the number of available tokens by a second increment value for transfer of information via the replication engine, when latency in responding to the client requests is less than a second threshold value and the traffic due to client requests has reached the first threshold value; and decreasing the number of available tokens for reducing transfer of information via the replication engine, when latency in responding to the client requests has reached a second threshold value and the traffic due to client requests has reached the first threshold value;

wherein a number of tokens for a read operation for reading information from the first location is different from a number of tokens for a write operation for writing at the second location.

19. The method of claim 18, wherein a processor executable monitoring module interfaces with the storage system for maintaining a data structure used for increasing and decreasing the number of available tokens.

20. The method of claim 19, wherein the data structure stores the first threshold value and the second threshold value.

21. The method of claim 19, wherein the data structure stores traffic information obtained from the storage operating system.

22. The method of claim 19, wherein the data structure stores latency information obtained from the storage operating system.

* * * * *